(12) United States Patent
Perkins

(10) Patent No.: US 8,133,388 B2
(45) Date of Patent: Mar. 13, 2012

(54) WASTE WATER FILTERING SYSTEM

(76) Inventor: John Larry Perkins, Lufkin, TX (US)

( * ) Notice: Subject to any disclaimer, the term of this patent is extended or adjusted under 35 U.S.C. 154(b) by 0 days.

(21) Appl. No.: 11/805,973

(22) Filed: May 26, 2007

(65) Prior Publication Data

US 2008/0290015 A1    Nov. 27, 2008

(51) Int. Cl.
*B01D 21/02*    (2006.01)
(52) U.S. Cl. ............. 210/170.08; 210/253; 210/532.2; 210/538; 405/43; 405/45
(58) Field of Classification Search .......... 210/170.01, 210/170.08, 253, 259, 532.2, 538; 405/36, 405/43, 45
See application file for complete search history.

(56) References Cited

U.S. PATENT DOCUMENTS

| | | | | |
|---|---|---|---|---|
| 1,529,019 A * | 3/1925 | Evans | ................. | 210/532.2 |
| 1,616,394 A * | 2/1927 | Schiding | ................. | 210/532.2 |
| 3,109,813 A * | 11/1963 | Bergsten | ................. | 210/532.2 |
| 3,666,106 A * | 5/1972 | Green | ................. | 210/533 |
| 3,919,848 A * | 11/1975 | Sullivan | ................. | 405/43 |
| 4,017,395 A * | 4/1977 | Davis | ................. | 210/167.3 |
| 4,228,006 A * | 10/1980 | Hanna | ................. | 210/167.3 |
| 4,465,594 A * | 8/1984 | Laak | ................. | 210/170.08 |
| 4,812,237 A * | 3/1989 | Cawley et al. | ................. | 210/605 |
| 5,114,586 A * | 5/1992 | Humphrey | ................. | 210/259 |
| 5,192,426 A * | 3/1993 | DeCoster et al. | ................. | 405/36 |
| 6,379,546 B1 * | 4/2002 | Braun | ................. | 210/167.3 |
| 6,887,375 B2 * | 5/2005 | Johnson | ................. | 210/170.08 |
| 7,118,669 B1 * | 10/2006 | Branz | ................. | 210/170.08 |
| 2008/0035545 A1 * | 2/2008 | Aumis | ................. | 210/170.08 |

* cited by examiner

*Primary Examiner* — Christopher Upton
(74) *Attorney, Agent, or Firm* — Delphine James

(57) ABSTRACT

A wastewater filtering system is provided for the passage of the wastewater from the home to the septic tanks prior to passage to the drain fields. The system comprises a separate septic tank assembly and a grease trap assembly operatively adapted to receive the wastewater from the home prior to the passage of the wastewater into the drain fields. Septic tank assembly and grease trap assembly are specifically configured to separate the filtering of waste water from the kitchen from the sewage from the bathrooms to prevent the clogging of the entire filtering system.

17 Claims, 4 Drawing Sheets

WASTE WATER FILTERING SYSTEM

BACKGROUND

The present invention relates to private wastewater treatment systems. More particularly, the present system relates to a septic tank and grease trap arrangement which allow for the passage of wastewater into a drain field. The filtering arrangement of the present invention prevents the clogging of the private sewage disposal system.

Municipal treatment systems consist of various processes involving the collection and treatment of liquid carried wastes from various households and industrial plants. Generally, Wastewater is carried from the plurality of households and commercial facilities into a network of sewage disposal pipe systems and then into a treatment facility In rural areas where houses are spaced far apart, private sewage treatment plants called septic tanks are installed. Septic tanks are generally large concrete or steel tanks buried in the ground that may hold approximately 1000 gallons of water. Waste water flows into the tank at one end and leaves the tank at the other end. Grease traps are installed to prevent grease, fat, oil, and other debris from entering the sewage systems. These types of materials clog the sewage system and cause back flows. The present invention is a uniquely designed private sewage treatment plant that comprises a grease trap and septic tank assembly uniquely configured to prevent backflows.

SUMMARY

The object of the invention is to provide a filtering arrangement that is more efficient and cost effective than other private treatment systems.

Another object of the invention is to provide a filtering system that requires very little maintenance.

Other objects of the invention will become more evident from the review and consideration of the attached description and drawings.

A wastewater filtering system is provided for the passage of the wastewater from the home to the septic tanks prior to passage to the drain fields. The system comprises a separate septic tank assembly and a grease trap assembly operatively adapted to receive the wastewater from the home prior to the passage of the wastewater into the drain fields. Septic tank assembly and grease trap assembly are specifically configured to separate the filtering of waste water from the kitchen from the sewage from the bathrooms to prevent the clogging of the entire filtering system.

The septic tank assembly comprises a first tank and a second tank buried below ground level. The first tank receives the sewage from the home and filters the waste water into the second tank. The grease trap assembly comprises a third tank that receives waste water containing grease from the home, filters the grease from the waste water, and passes the waste water onto the drain field.

DESCRIPTION OF THE PRESENT INVENTION

Figure 1:
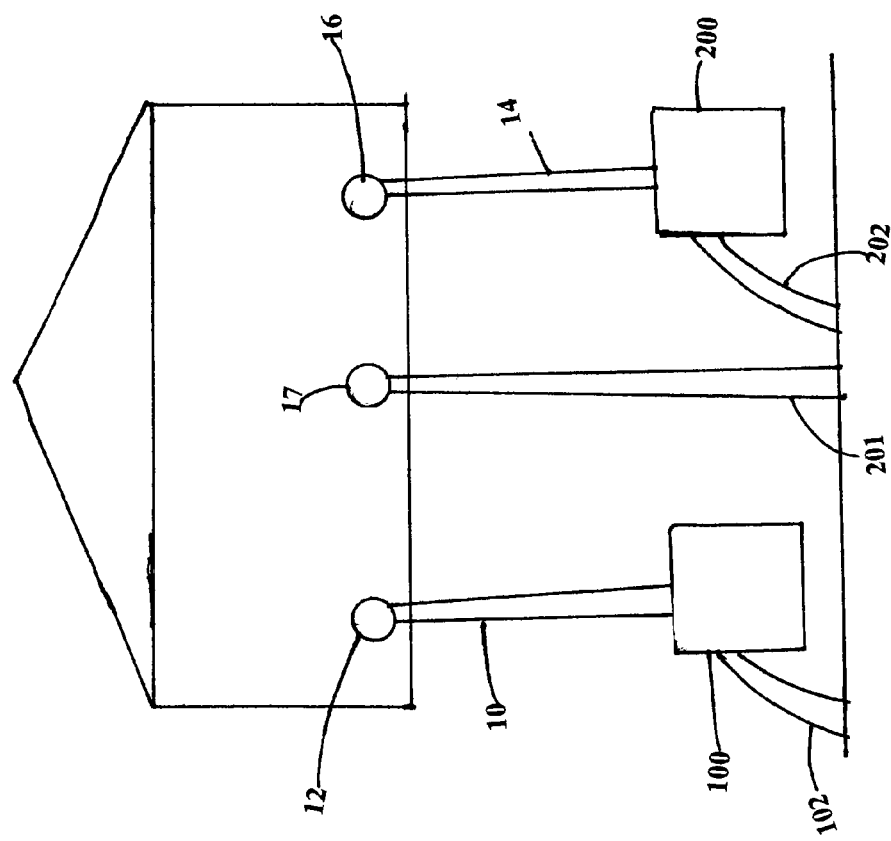
FIG. 1 is a block diagram overview of the private treatment filtering system of the present invention.

Referring to FIG. 1, there is shown a block diagram overview of the present invention, a private wastewater treatment system 2 buried in the earth. The system comprises a grease trap assembly 100 and a septic tank assembly 200 filtering arrangement which provides effective passage of the waste water from the home through outlet pipes 102 and 202 into drain field 300.

Domestic sewage results from people's day-to-day activities, such as bathing, body elimination, food preparation, and recreation, averaging about 60 gallons per person daily. Unlike the water-supply system, wastewater from domestic sewage flows through sewer pipes by gravity rather than by pressure. The pipe must be sloped to permit the wastewater to flow at a velocity of at least 0.46 m per sec (1.5 ft per sec), because at lower velocities the solid material tends to settle in the pipe.

Figure 2:
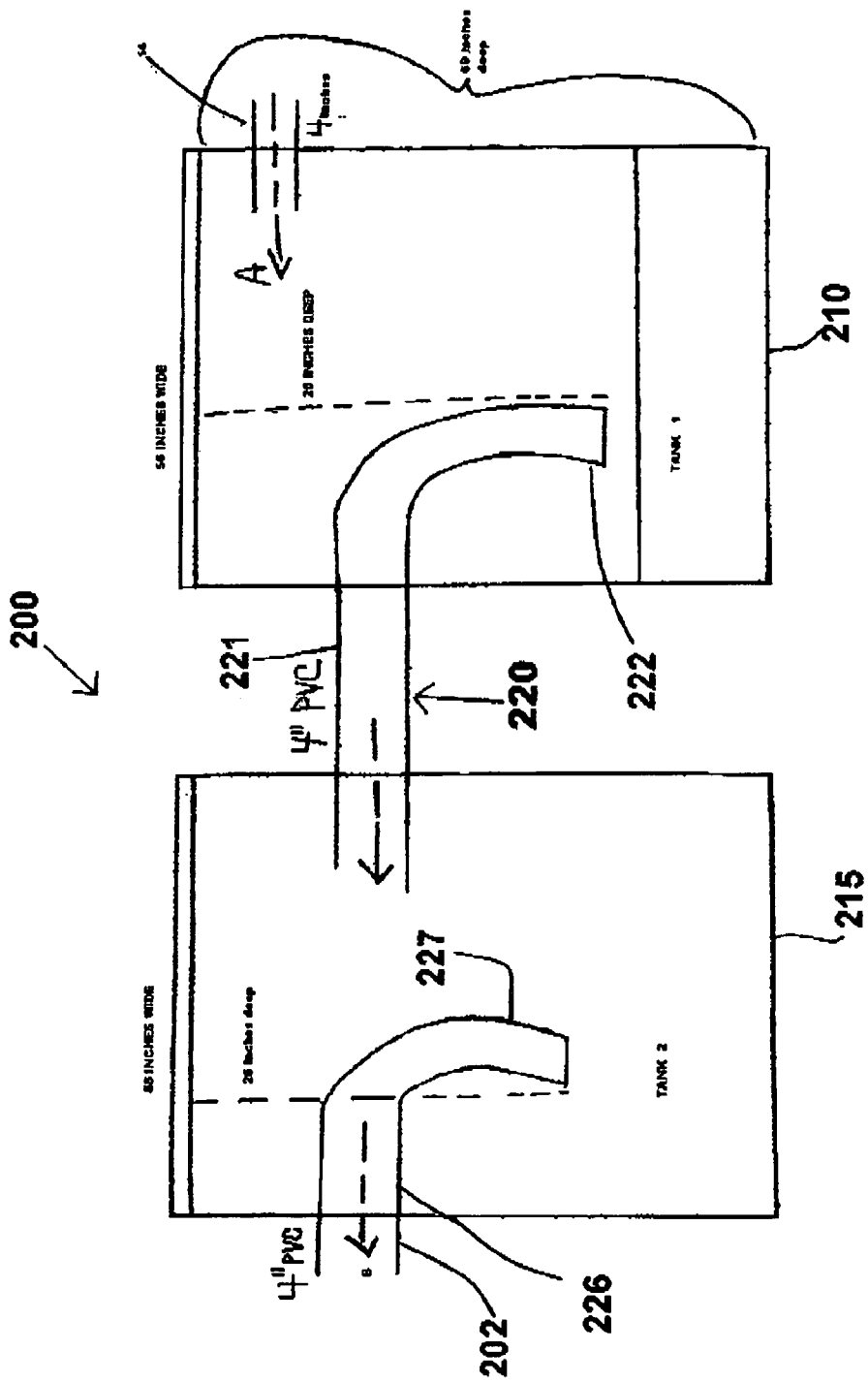
FIG. 2 is a side view of the septic tank assembly.
Figure 3:
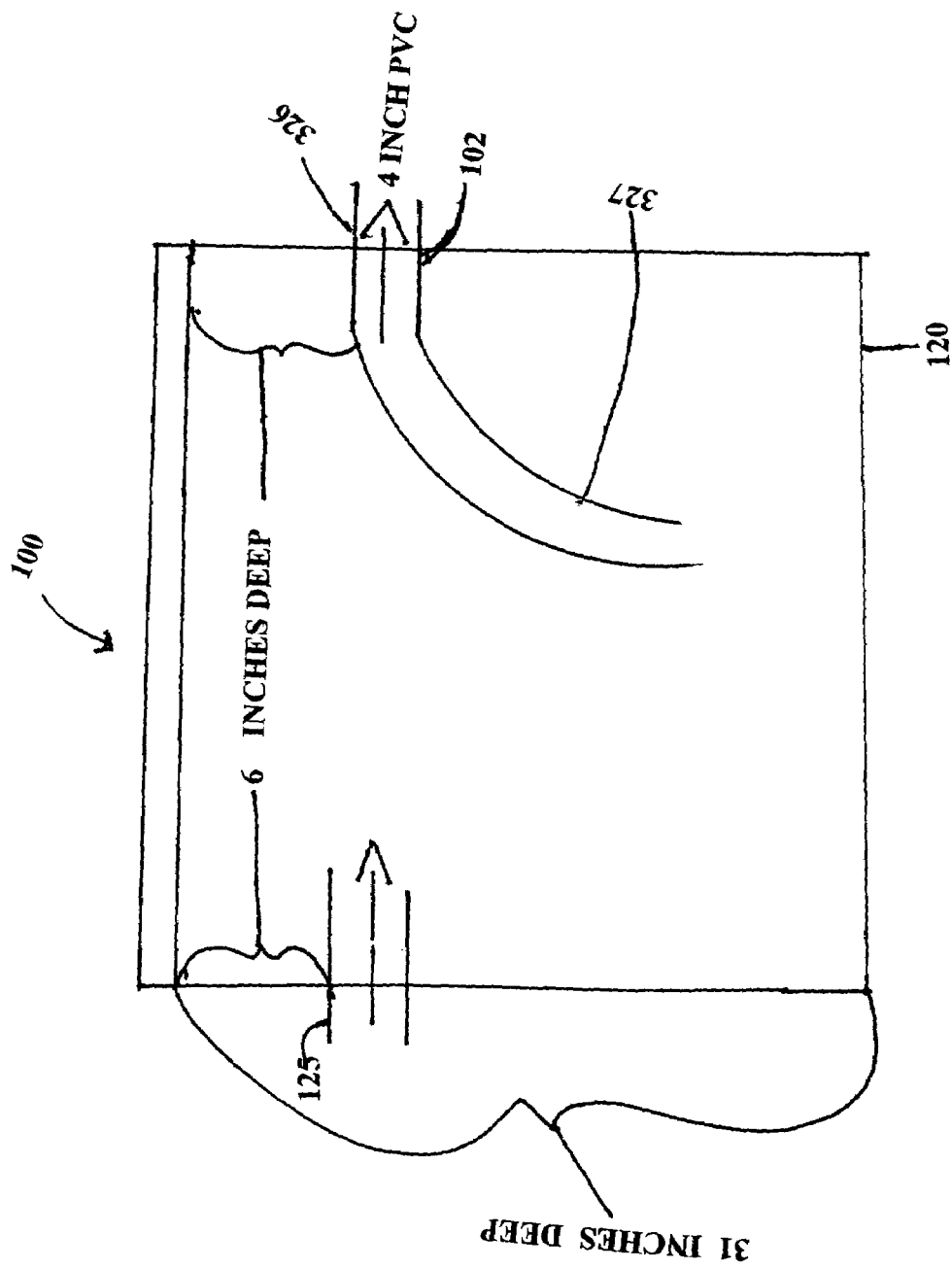
FIG. 3 is a side view of the grease trap assembly.

As depicted in FIG. 2, the separation of the waste water leaving the kitchen from the sewage prevents the clogging of the entire system. As shown in the present invention sewage pipes 10 leaving the kitchen 12 flows into the grease trap assembly 100 while sewage pipes 14 leaving the bathroom 16 flows into the septic tank assembly 200.

Referring to FIG. 2 there is shown a side view of septic tank assembly 200. Septic tank assembly 200 further comprises first tank 210 aligned adjacent to second tank 215. Both tanks are buried below ground level and extend vertically upward to ground level leaving an opening into the cavity of the tank. In the preferred embodiment first tank 210 and second tank 215, each is made of concrete covered with a two inch lid to cover the opening of the cavity of each tank. As shown, first tank 210 and second tank 215, each is approximately 56 inches wide and extends approximately 60 inches downward in depth.

Entrance pipe 14 extends horizontally into the cavity of first tank 210 from approximately 10 inches in depth from the top of the first tank 210 and interconnects with outlet sewage pipe 16. Entrance pipe 14 is preferably a 4 inch diameter PVC pipe. Waste water flows from the home through sewage pipe 16 into entrance pipe 14 and then into first tank 210. Once the waste water is inside the cavity of the tank, the heavier waste solids sink to the bottom of first tank 210. The water floats above the waste solids and exits into second tank 210 through interconnecting pipe 220.

Interconnecting pipe 220 connects first tank 210 to second tank 210 and extends horizontally across the cavity of both tanks at a depth of 10 inches downward in depth from the top of both tanks. Interconnecting pipe 220 is preferable 4 inches in diameter PVC elbow pipe and is formed from linear tubular portion 221 adjoined with curved tubular portion 222. Linear tubular portion 221 extends horizontally across the cavity of both tanks and provides fluid communication between the first tank 210 and second tank 210.

Linear tubular portion 221 provides drainage of the waste water from first tank 210 into second tank 210. Curved tubular portion 222 extends downward vertically into the cavity of first tank 210 to a depth of approximately 26 inches into the cavity of first tank 210.

Figure 4:
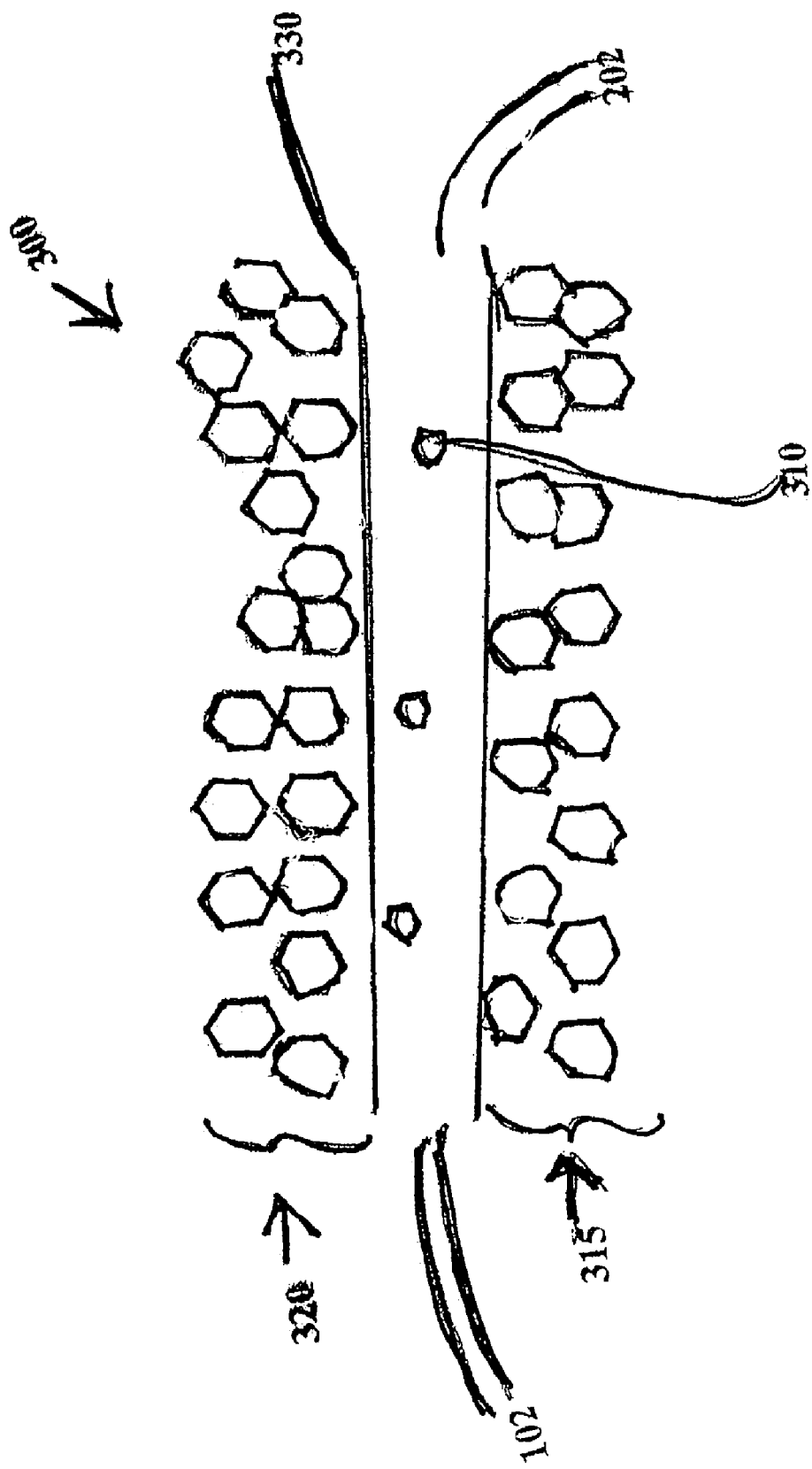
FIG. 4 is a cross-sectional side view of the drain field.

Exit pipe 202 provides drainage of the waste water from second tank 215 and is connected with the adjoining drain field 330 illustrated in FIG. 4. Exit pipe 225 is preferable 4 inches diameter PVC elbow pipe and is formed by linear tubular portion 226 adjoined to curved tubular portion 227. Linear tubular portion 226 extends horizontally out of the cavity of second tank 215 and interconnects with drain field pipe 330 shown in FIG. 4. Curved tubular portion 227 extends downward vertically into the cavity of second tank 215 from the top of second tank 210 to a depth of 26 inches within the cavity of second tank 215.

The bacteria in the both tanks will automatically and continually eat the waste from the home because there is no detergent from the kitchen side of the home to interfere with the process. There is no grease in the tank to cover the tank and destroy the bacteria in the two tanks. The first tank 210 holds the majority of the solids and the second tank 215 hold the waste water prior to discharging and exiting to the drain field line 300 through exit pipe 202.

Grease trap assembly 100 further comprises a third tank 120, buried below ground level. Third tank 120 is preferably 26 inches in diameter and extends downward 31 inches depth. Entrance pipe 125 extends laterally into third tank 120 and interconnects with the pipe 12 exiting the kitchen of the home. Entrance pipe 125 is preferably 2 inches wide PVC pipe and is positioned approximately from the top of third tank 120 6 inches in depth within the cavity of third tank 120.

Exit pipe 102 exits the waste water from third tank 120 and interconnect with the adjoining drain field line 300 illustrated in FIG. 4. Exit pipe 102 is preferable 4 inches wide PVC elbow pipe and is formed by linear tubular portion 326 adjoining curved tubular portion 327. Linear tubular portion 326 extends horizontally into the cavity of third tank 120. Linear tubular portion 326 provides drainage of waste water from third tank 120 into drain field line pipe 330. Curved tubular portion 327 extends into third downward vertically from the top of second tank 310 to a depth of 11 inches within the cavity of third tank 120.

Within the cavity of third tank 120, the grease thickens and floats to the top of the waste water. Curved tubular portion 327 extends downward into the cavity below the grease to allow the waste water to exit through the linear portion 326 of exit pipe 102 into adjoining drain field line 300. This system is very effective. Maintenance is required only every 10 to 15 years. Every now and then you may have to clean out the grease trap.

Exit pipes 202 from second tank 215 and exit pipe 102 from third tank 120 are both in fluid communication with field line main pipe 330. Field line main pipe 330 is preferable 4 inches wide PVC pipe perforated with holes 1 inch by 1 inch on both sides of the wall of the pipe approximately every 6 inches. However, FIG. 4 only illustrates the holes on one side of the wall Field line pipe 330. Field line main pipe 330 sits on 8 inches of crushed rock 315 and is covered with 8 inches of crushed rock 320. A two foot wide drain ditch is covered with dirt and the length is based upon the number of people in the house. One extra foot is needed for each extra person in the home. In this configuration only waste water soaks into the ground. As the water soaks into the ground, the dirt will automatically clean and purify the water. Because the drain line is covered with rock, the dirt cannot clog up the drain line holes.

Additionally, the system can have a washing machine outlet 17 from the building as shown in FIG. 1. Pipe 201 interconnects the washing outlet to the drain field 300. The waste water from the washing machine outlet 17 directly drains into the drain field assembly 300 thereby preventing the detergent from interfering with the sewage assembly waste decomposition process.

I claim:

1. A stand alone waste disposal system for a building with a separate sewage outlet
and a kitchen outlet, the system further comprising:
a grease trap assembly for receiving through the kitchen outlet waste having a grease portion and a liquid portion, a sewage assembly for receiving through the sewage outlet waste having a solid portion and a liquid portion and a drain field; the grease trap assembly and sewage assembly each being directly connected to and in fluid communication with the drain field assembly wherein the system maintenance is substantially reduced;
the sewage assembly comprising:
a first tank situated below ground level having an inlet pipe in fluid communication with the sewage outlet;
a second tank having an outlet elbow shape pipe in fluid communication with and draining directly into the drain field assembly;
the first tank having equivalent dimensions as the second tank with each tank having a cavity with a first side wall opposing a second sidewall; the first tank coupled to and in fluid communication with the second tank through an interconnecting elbow pipe;
the interconnecting elbow pipe positioned at a first predetermined depth within the second side wall of the first tank and the first side wall of the second tank to allow for optimum fluid communication flow of the liquid waste between the first tank and the second tank;
the inlet pipe extending laterally into the cavity of the first tank and being positioned at a third predetermined depth through the first sidewall of the first tank to allow for optimum fluid communication into the first tank; and the outlet pipe being positioned at a second predetermined depth within the second side wall of the second tank to allow for optimum fluid communication flow of the liquid waste into the drain field assembly;
the grease trap assembly comprising:
a first tank situated below ground level having an inlet pipe in fluid communication with the kitchen outlet and an outlet pipe in fluid communication with and draining into the drain field assembly;
the first tank having a cavity with a first sidewall opposing a second sidewall;
the outlet pipe having an elbow shape with a first section and a second section;
the first section extending laterally into the cavity of the first tank and being positioned at a first predetermined depth through the second sidewall of the first tank to allow for optimum fluid communication flow into the first tank; the second section extending vertically downward into the cavity of the first tank to a first predetermined position into the cavity of the first tank below the grease portion stored in the first tank allowing the liquid portion to drain through the first section directly into the drain field assembly;
the inlet pipe being positioned at a second predetermined depth within the first side wall of the first tank to allow for optimum fluid communication flow of the waste from the kitchen outlet into the cavity of the first tank;
the drain field assembly comprising:
a first portion of crushed rock of a first predetermined width, a second portion of crushed rock of a second predetermined width, and a field line pipe situated below ground level at a predetermined position for optimum waste disposal;
the field line pipe being sandwiched between the first portion of crushed rock and the second portion of crushed rock;
the field line pipe having a first wall opposing a second wall with holes at a equidistant position along both the first wall and the second wall the allowing the waste water from the sewage assembly and the grease trap assembly to drain;

the field line pipe in fluid communication with the outlet pipe of the second tank of the first sewage assembly and in fluid communication with the outlet pipe of the first tank of the grease trap assembly.

2. The system of claim 1 wherein the first tank and the second tank of the septic tank assembly is at least 56 inches in width and at least 60 inches in depth.

3. The system of claim 1 wherein the first predetermined in depth of the sewage assembly is equivalent the second predetermined depth of the sewage assembly.

4. The system of claim 3 wherein the first and second predetermined position is at least 26 inches in depth.

5. The system of claim 1 wherein the interconnecting pipe and the outlet pipe are at least four inches in width.

6. The system of claim 1 wherein the interconnecting pipe further comprises: a first section and a second section;

the first section extending linearly across the second side wall of the first tank of the sewage assembly first tank and into the first side wall of the second tank of the sewage assembly;

the second section curving downward into the cavity of the first tank and then extending vertically downward to a predetermined distance into the liquid waste portion stored within the first tank wherein the liquid portion of the waste material in the first tank can drain into the second tank through the first interconnecting pipe leaving the solid waste behind to naturally decompose.

7. The system of claim 6 wherein the first section is a least two inches in length.

8. The system of claim 6 wherein the first section is position at least 10 inches in depth within the first tank of the sewage assembly and the second tank of the sewage assembly.

9. The system of claim 6 wherein the second section extends at least twenty-six inches in depth within the first tank of the sewage assembly.

10. The system of claim 1 further comprising: a washing machine outlet from the building; a pipe interconnecting the washing outlet to the drain field wherein the waste water from the washing machine outlet directly drains into the drain field assembly thereby preventing the detergent from interfering with the sewage assembly waste decomposition process.

11. The system of claim 1 wherein the inlet pipe of the first tank of the sewage assembly is positioned at least 10 inches into the cavity of the first tank.

12. The system of claim 1 wherein the inlet pipe of the first tank of the grease trap assembly is positioned at least 10 inches into cavity of the first tank.

13. The system of claim 1 wherein the outlet pipe of the second tank of the sewage assembly is at least 10 inches into the cavity of the second tank.

14. The system of claim 1 wherein the outlet pipe of the first tank of the grease trap assembly is at least 6 inches into the cavity of the first tank.

15. The system of claim 1 wherein the first portion of crushed rock is at least 8 inches in width.

16. The system of claim 1 wherein the second portion of crushed rock is at least 8 inches in width.

17. The system of claim 1 wherein the first tank of the grease trap assembly is at least 28 inches wide and 31 inches deep.

* * * * *